(12) United States Patent
Shamir

(10) Patent No.: US 10,359,587 B2
(45) Date of Patent: Jul. 23, 2019

(54) BRIGHTNESS PRESERVING FIBER BEAM COMBINER FOR REDUCED NONLINEARITIES AND INTENSE RADIATION DAMAGE DURABILITY

(71) Applicant: SOREQ NUCLEAR RESEARCH CENTER, Yavne (IL)

(72) Inventor: Yariv Shamir, Kidron (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 0 days.

(21) Appl. No.: 15/124,433

(22) PCT Filed: Mar. 11, 2015

(86) PCT No.: PCT/IB2015/051757
§ 371 (c)(1),
(2) Date: Sep. 8, 2016

(87) PCT Pub. No.: WO2015/136453
PCT Pub. Date: Sep. 17, 2015

(65) Prior Publication Data
US 2017/0082812 A1    Mar. 23, 2017

Related U.S. Application Data

(60) Provisional application No. 61/952,890, filed on Mar. 14, 2014.

(51) Int. Cl.
*G02B 6/28*       (2006.01)
*G02B 6/42*       (2006.01)
(Continued)

(52) U.S. Cl.
CPC ......... *G02B 6/4296* (2013.01); *G02B 6/0281* (2013.01); *G02B 6/0288* (2013.01);
(Continued)

(58) Field of Classification Search
CPC  G02B 6/0281; G02B 6/0288; G02B 6/03627; G02B 6/255; G02B 6/2856; G02B 6/4296; C03C 13/046; H01S 3/06754
(Continued)

(56) References Cited

U.S. PATENT DOCUMENTS

2007/0089462 A1    4/2007  Farroni et al.
2008/0050075 A1*   2/2008  Fleming ................ C03C 13/046
                                                        385/123
2014/0248023 A1    9/2014  Nishimura

FOREIGN PATENT DOCUMENTS

WO    2013/126924    8/2013
WO    2013/153734    10/2013

OTHER PUBLICATIONS

PCT Written Opinion, PCT/IB2015/051757, dated Jul. 14, 2015.
(Continued)

*Primary Examiner* — Michael P Mooney
(74) *Attorney, Agent, or Firm* — Dekel Patent Ltd.; David Klein

(57) ABSTRACT

Method for adapting a fiber beam combiner to transmit at least 20 kW of optical power without noticeable bulk material damage mechanism effect and destructive nonlinearities, the method comprising: connecting an adiabatic beam combiner with a splice connection to an input facet of a graded index fiber which has a core doped with an index increasing material, further comprising the step(s) of: restricting the numerical aperture of the graded index fiber, and/or selecting the index increasing material with a Raman gain lower than that of $GeO_2$ such as $Al2O3$ or $Y2O3$, and/or placing a shroud tube around the graded index fiber core, said shroud tube comprising a fluorine-doped silica tube.

3 Claims, 1 Drawing Sheet

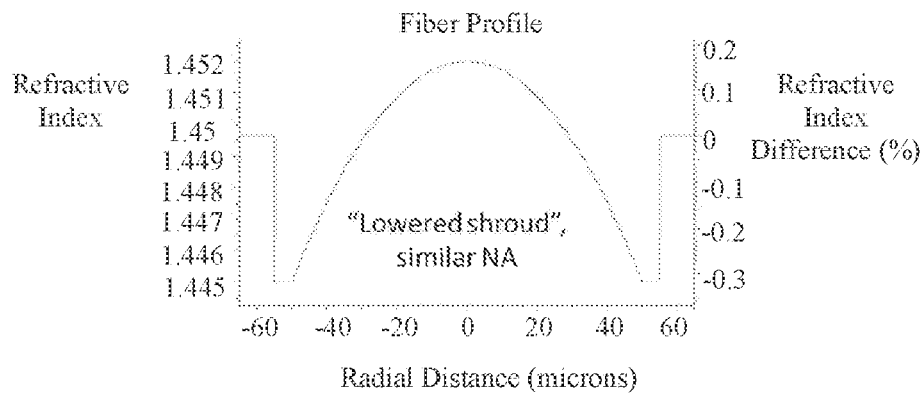

(51) Int. Cl.
   *G02B 6/028*   (2006.01)
   *G02B 6/036*   (2006.01)
   *G02B 6/255*   (2006.01)
(52) U.S. Cl.
   CPC ......... *G02B 6/03627* (2013.01); *G02B 6/255* (2013.01); *G02B 6/2856* (2013.01)
(58) Field of Classification Search
   USPC .......... 385/31, 43, 95–96, 126, 127; 65/385, 65/406, 407, 408
   See application file for complete search history.

(56) References Cited

OTHER PUBLICATIONS

Yariv Shamir et al, "Spatial beam properties of combined laser delivery fibers", Optics Letters, Optical Society of America, US, vol. 37, No. 9, May 1, 2012, pp. 1412-1414.
"Inside view", Electronic Letters, IET Stevenage, GB, vol. 49, No. 14, Jul. 4, 2013, pp. 853-854.

\* cited by examiner

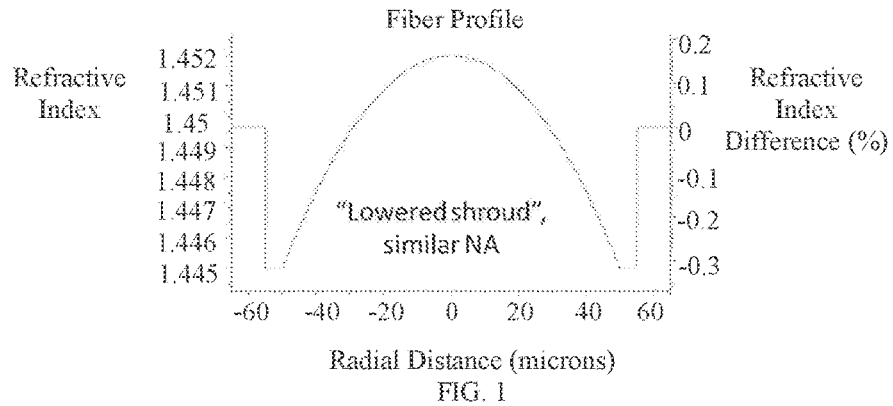

FIG. 1

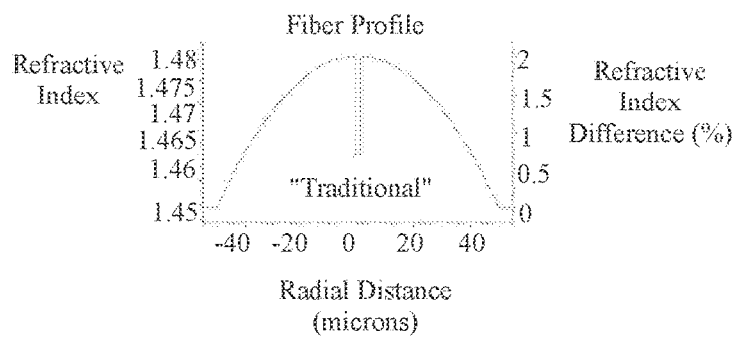

FIG. 2
PRIOR ART

| CONNECTING AN ADIABATIC BEAM COMBINER WITH A SPLICE CONNECTION TO AN INPUT FACET OF A GRADED INDEX FIBER WHICH HAS A CORE DOPED WITH AN INDEX INCREASING MATERIAL, THE GRADED INDEX FIBER HAVING A NUMERICAL APERTURE |
|---|

| PLACING A SHROUD TUBE AROUND THE GRADED INDEX FIBER CORE, WHICH ADAPTS THE BEAM COMBINER TO TRANSMIT AT LEAST 20 KW OF OPTICAL POWER WITHOUT NOTICEABLE BULK MATERIAL DAMAGE MECHANISM EFFECT AND DESTRUCTIVE NONLINEARITIES |
|---|

FIG. 3

BRIGHTNESS PRESERVING FIBER BEAM COMBINER FOR REDUCED NONLINEARITIES AND INTENSE RADIATION DAMAGE DURABILITY

FIELD OF THE INVENTION

The present invention relates to a novel fiber beam combining device that is suitable for handling very high optical powers. When operated, it shows low nonlinearities and high radiation and thermal damages durability, with respect to prior art devices. Moreover, it can either preserve the brightness obtained from several mutually incoherent incident optical beams, or even enhance brightness by a factor of N, if N mutually coherent beams are used.

BACKGROUND OF THE INVENTION

Multimode (MM) commercially available intra-fiber combiners are nowadays very common devices. If operated at their ultimate performance, they can approach output brightness preservation, in parallel with nearly perfect power transmission. However, only poor (i.e. high value of) spatial beam-parameter-product (BPP), a quantitative measure of brightness level, can be obtained, and therefore these devices are not suited for directed radiation applications. (See, for example, U.S. Pat. No. 7,046,875 "Optical coupler comprising multimode fibers and methods of making the same" and U.S. Pat. No. 6,434,302 "Optical couplers for multimode fibers".)

Recently, strictly or nearly strictly SM (single-mode) combiners were demonstrated in a power range of few watts to several kw, either under incoherent as well as coherent operation regimes (Y. Shamir et-al, JOSA-B, V. 27, N. 12, 2669-2676 (2010), Y. Shamir et-al, Proc. SPIE, Photonics West, DOI: 10.1117/12.841720 SF. CA. (2010), Y. Shamir et-al, Optics Letters, V. 36, N. 15, 2784-2876 (2011), Y. Shamir et-al, OASIS, SPIE meeting on Optical Engineering and Science, TLV. IL (2011), Y. Shamir et-al, Optics Letters, V. 39 N. 7 1412-1414 (2012)). On either of the operation regimes (incoherent or coherent), these devices are capable of producing as well as delivering the lowest obtainable BPP for side by side combining, basically as a result of keeping adiabatic mode propagation within itself. High power operation was successful since LMA (large-mode-area) fibers and large MM delivery fibers were used, thereby reducing power density.

Guiding the combined signal further away from the combining element and yet preserving the BPP obtained by the combiner, has been a long-standing-issue in the field of high power combiner applications. A suggested solution has been previously proposed by the inventors, stating that if a specialty designed core, which can be specifically a GI (graded-index) core, and more specifically, a PI (parabolic-index) core fiber, is used, the spatial properties, i.e. BPP, at any cross-section, can be preserved. Several demonstrations confirmed these assumptions up to a few Kw. However under extreme power levels of multi Kw, new barriers, in the form of thermal distortions, nonlinearities and fiber silica damages, are the next issue to be addressed. A problem is that multi-Kw optical beams are destructive to fibers and related components under long propagation in narrow spot size.

A method for achieving this goal is to combine several techniques in parallel. A straightforward approach is just to fabricate wider devices, and obtain larger beam spot diameter correspondingly; this is possible, although at the expense of BQ (beam quality), a cost that cannot be paid in some applications. Second direction is to use the latter with combinations of additional factors: lower dopant concentration, different dopant materials, as well as using larger delivery core, so as to battle the negative effects in parallel. In what follows we show guidelines for resolving the high power challenge.

SUMMARY OF THE INVENTION

In contrast to the prior art, the present invention relates to a large combiner whose waist width can confine a few-mode beam to a level that it is compressed to give the lowest BPP (beam parameter product) value, yet has intensity levels that are factors below the silica bulk damage.

The present invention provides an efficient and high beam quality combiner device of several fiber lasers, with high nonlinearities threshold, high bulk damage threshold and lower concentration of dopant material.

The present invention provides a beam combining device that preserves brightness of the incident sources (sum of brightness for mutually incoherent sources), enables ultra-high average power, typically, but not restricted to, multi-tens of kW (i.e., typically at least 20 or at least 30 kW) of optical power and has a very high nonlinear threshold (specifically of SBS (stimulated Brillouin scattering) radiation) such that it operates intact at the very high optical power range. Prior art combining devices cannot provide all of these capabilities simultaneously, because one of the limitations (brightness level/nonlinearities/damage) would occur once a multi-Kw beam is transported.

A fiber beam combiner assembly includes a high quality adiabatic beam combiner which is bonded with a splice connection to an input facet of a graded index (GI) fiber. The enlarged diameter of the combiner's waist is designed such that it can still accommodate narrow beams with high qualities, although it is wide enough to avoid silica damage. The GI delivery fiber is preferably, but not restricted to, a parabolic index fiber that contains gradually varying index-increasing material concentration (such as $GeO_2$), but with reduced levels relative to common available GI fibers. While such available fibers have typically (although can vary) 0.29-peak-NA (numerical aperture) (corresponding to ~19% mol (29% wt) in the specific example of $GeO_2$ fraction), the novel design should contain lower levels. This may come at the expense of higher sensitivity to signal misalignment between the combiner and the delivery fiber, so that processes should be handled more accurately.

Another advantage of the invention is avoiding or reducing the "refraction index hole" at the center of the GI core. This was evidently caused by the traditional fabrication method of GI fibers, based on gradually evaporating high-index material on the inner walls of a hollow silica tube and then collapsing both to the final fiber diameter using heat.

Another embodiment of the invention creates an accurate parabolic refraction index profile. Previous attempts in the prior art created a gradual index profile, that is close to being "parabolic", and even that only at the inner diameter of the fiber's core (typically, the central ⅓ of the core). Once a signal is launched out of this regime, where deviation from perfect parabolic index profile may occur, BPP is hardly kept, and brightness is severely deteriorating if launched close to the core's edge. In the present invention, there is a full parabolic profile across the whole core's region, thereby assuring a strict BPP preservation of whatever signal is launched into the GI core, as long as it is within the acceptance solid-angle (NA) of the fiber.

BRIEF DESCRIPTION OF THE DRAWINGS

The present invention will be understood and appreciated more fully from the following detailed description, taken in conjunction with the drawings in which:

FIG. 1 is an illustration of a lower peak index graded index core fiber, combined with lowered-index shroud tube that encircles the core, in accordance with an embodiment of the invention.

FIG. 2 is an illustration of a prior art refractive index profile of a graded index fiber.

FIG. 3 is a flow chart of connecting an adiabatic beam combiner with a splice connection to an input facet of a graded index fiber, in accordance with an embodiment of the invention.

DETAILED DESCRIPTION OF EMBODIMENTS

In contrast to the prior art, the present invention relates to a large combiner whose waist width can confine a few-mode beam to a level that it is compressed to give the lowest BPP value, yet is enough wide such that it maintains intensity levels that are factors below the silica bulk damage. This dielectric/bulk damage threshold is mostly referred to as 5 w/$\mu m^2$ and 10 w/$\mu m^2$ for exit facet (silica-air boundary) and internal glass (i.e. material continua), respectively (Dawson et-al, Optics Express (2010)).

Traditional GI (graded-index) fiber fabrication is done by gradually doping of materials into the core, that, as a side effect, have high nonlinearity gain, of which SRS (stimulated Raman scattering) becomes a major challenge. A very common material used for index increasing is $GeO_2$. However, the most prominent characteristic of this addition is its Raman Gain, which is ~8-9 times higher than of pure silica ($g_R(Si—O_2) \approx 1.05e-13$ m/w, with spectral gain peak at stokes wave shifted by $\Delta v \sim -13$ THz from the laser pump line). Using a gradually varying $GeO_2$ concentration in a core with peak concentration corresponding to traditional acceptance angle values (NA=0.29), with MM beam, yields an overall SRS gain that is of factors higher (anywhere between that of the host and the dopant) than of silica.

In order to battle this effect, embodiments of the present invention cover the following guidelines:

Use lower peak NA values (like, but not restricted to 0.15<NA<0.25), which is translated to lower $GeO_2$ concentration (% mole or % weight). For example: if a peak NA of 0.15 is used instead of the traditional 0.29 value, only about 5% (mol) of the $GeO_2$ is used (instead of 20% in the prior art).

Use index-increasing materials with lower Raman gain $g_R$ with respect to $GeO_2$. Non-limiting examples of index-increasing materials instead of $GeO_2$ are $Al_2O_3$ and $Y_2O_3$. Their refractive indices in the 1 µm spectral region are n≈1.75 and n≈1.9 at $\lambda$=1070 nm, respectively. Both either broaden and reduce the SRS peak gain spectrum, and are therefore appropriate to use for this purpose. Typical overall SRS attenuation of 50%.

Use an additional lower index "shroud tube" around the GI core; this leads to the same effective NA as if silica clad with "standard" $GeO_2$ was used. For example: if a (e.g., 5% mol) fluorine-doped silica "tube" is placed around the core, an effective confinement of typically ~0.25 NA is obtained within the silica core. In such case, doping $GeO_2$ into the core to the required parabolic profile can be achieved with a much lower concentration, to the vicinity of ~5% mol.

Use larger exit facet of the combining element (and corresponding waist size) to reduce power densities, lead to reduces bulk damage likelihood and lower nonlinear scatterings. (An example is given in the following paragraph).

Using larger GI core, in correspondence with the larger combiner s exit aperture (see former sections). This enables comfortable injection of the signal from the combiner into the delivery fiber, as well as accommodating the larger signal, compared to prior arts. For example, if a combiner is fabricated with a double-size output exit diameter with respect to standard GI fibers (50 µm and 62.5 µm are very common), and a roughly similar increase of beam spot size is also applied, power density is fourfold reduced. This enables roughly four times higher optical power delivery (bulk damage aspect) and fourth-exponential power higher SRS threshold.

The present invention provides an efficient and high beam quality combiner device of several fiber lasers, with high nonlinearities threshold, high bulk damage threshold and lower concentration of dopant material.

FIG. 1 is an illustration of a lower peak index graded index core fiber, combined with lowered-index shroud tube that encircles the core, in accordance with an embodiment of the invention. The overall effect is of high control on core's profile, effectively providing similar performance of higher refraction-index materials, while using a lower absolute dopants concentration. Also shown in FIG. 1 is the absence of a central refraction-index "void", responsible for some of the brightness decrease previously observed with prior art GI fibers.

What is claimed is:

1. A method for adapting a fiber beam combiner to transmit at least 20 kW of optical power without noticeable bulk material damage mechanism effect and destructive nonlinearities, the method comprising:
    connecting an adiabatic beam combiner with a splice connection to an input facet of a graded index fiber which has a core doped with an index increasing material, said graded index fiber having a numerical aperture,
    placing a shroud tube around the graded index fiber core, which adapts said beam combiner to transmit at least 20 kW of optical power without noticeable bulk material damage mechanism effect and destructive nonlinearities, and restricting the numerical aperture NA to be 0.15<NA<0.18.

2. The method according to claim 1, wherein the shroud tube comprises a fluorine-doped silica tube.

3. The method according to claim 1, further comprising selecting the index increasing material with a Raman gain lower than that achieved by a typical 20 mol % of $GeO_2$ dopant level.

* * * * *